United States Patent [19]

Nishiyama

[11] Patent Number: 5,602,740
[45] Date of Patent: Feb. 11, 1997

[54] OBJECTIVE POSITION INFORMATION SUPPLYING METHOD IN NAVIGATION SYSTEM, AND NAVIGATION SYSTEM

[75] Inventor: Sumio Nishiyama, Tokyo-to, Japan

[73] Assignee: Pioneer Electronic Corporation, Tokyo-to, Japan

[21] Appl. No.: 434,684

[22] Filed: May 4, 1995

[30]     Foreign Application Priority Data

May 13, 1994   [JP]   Japan .................................. 6-100285

[51] Int. Cl.⁶ ........................... G06F 15/50; G01C 21/00
[52] U.S. Cl. ..................... 364/449.1; 364/444.1; 364/458; 340/995
[58] Field of Search ..................... 364/443, 444, 364/447, 449, 450, 453, 456, 458, 460; 340/988, 990, 995, 438, 384.1; 73/178 R

[56]            References Cited

U.S. PATENT DOCUMENTS

| | | | |
|---|---|---|---|
| 4,879,658 | 11/1989 | Takashima et al. | 364/449 |
| 4,963,864 | 10/1990 | Iihoshi et al. | 340/995 |
| 5,159,556 | 10/1992 | Schorter | 364/449 |
| 5,339,246 | 8/1994 | Kao | 364/457 |
| 5,367,463 | 11/1994 | Tsuji | 364/449 |
| 5,394,332 | 2/1995 | Kuwahara et al. | 364/449 |
| 5,398,189 | 3/1995 | Inoue et al. | 364/449 |
| 5,408,415 | 4/1995 | Inoue et al. | 364/449 |

*Primary Examiner*—Kevin J. Teska
*Assistant Examiner*—Tan Q. Nguyen
*Attorney, Agent, or Firm*—Young & Thompson

[57]            ABSTRACT

An objective position information supplying method in a navigation system for detecting a present position of a self vehicle, includes the steps of: judging whether or not a distance between the detected present position and an objective position is within a predetermined distance set for each of objective positions, which include a position scheduled to pass therethrough and a position scheduled to arrive thereat; judging whether or not a direction to the detected present position from the objective position is within a first angle range, which is set for each of the objective positions on a standard of a direction of the self vehicle to enter each of the objective positions; judging whether or not a direction to the objective position from the detected present position is within a second angle range, which is set with respect to an advance direction of the self vehicle at the detected present position; and supplying a predetermined kind of information as for the objective position to a driver if the judged distance is within the predetermined distance, if the judged direction to the detected present position is within the first angle range, and if the judged direction to the objective position is within the second angle range.

14 Claims, 9 Drawing Sheets

OBJECTIVE POSITION INFORMATION SUPPLYING METHOD IN NAVIGATION SYSTEM, AND NAVIGATION SYSTEM

BACKGROUND OF THE INVENTION

1. Field of the Invention

The present invention generally relates to a navigation system, and more particularly to an objective position information supplying method in a navigation system, which can supply various information as for an objective position to a driver, on the basis of the positional relationship between the detected self vehicle position and the objective position such as a destination and a passing position on the way to the destination.

2. Description of the Related Art

According to a navigation system, especially to an on-vehicle type navigation system, various information is supplied to a driver on the basis of the self vehicle position which is measured in a self sustained manner on the basis of the information from various sensors such as an earth magnetism sensor, an angular speed sensor and a travel distance sensor etc. which are mounted on a vehicle, or on the basis of the self vehicle position measured by use of the GPS (Global Positioning System).

As one of the supplies of this information, there is a supply of the information as for a scheduled passing position on a middle route to a scheduled arrival position from a starting position.

Figure 8A:
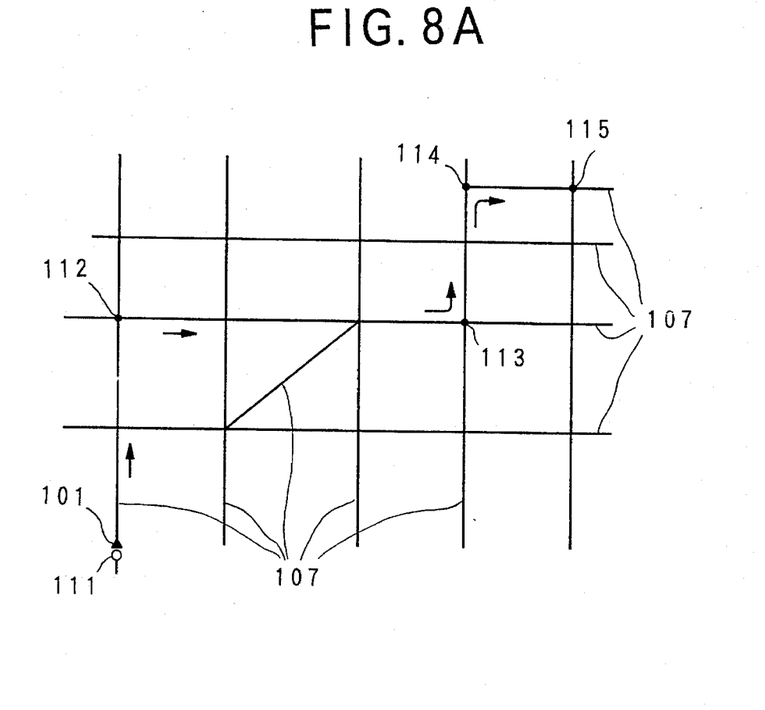

By this, the user sets a plurality of scheduled passing positions between a starting position 111 and a scheduled arrival position 115 in advance before starting as shown in FIG. 8A (in FIG. 8A, there are set 3 scheduled passing positions 112 to 114), and starts from the starting position 111. Then, on the route to the scheduled arrival position on a plurality of roads 107, when it is approaching to each of the scheduled passing positions or the scheduled arrival position (hereinbelow, these are referred to as objective positions all together), the fact that it is approaching is informed to the driver by an audio voice or a display. By this, the driver recognizes that it is advancing to the scheduled arrival position on a correct route.

In case of informing by use of the audio voice, for example, when it is approaching to the scheduled passing position A 112 as shown in FIG. 8A, it is informed to the driver as "we are soon at the scheduled passing position A 112".

Figure 8B:
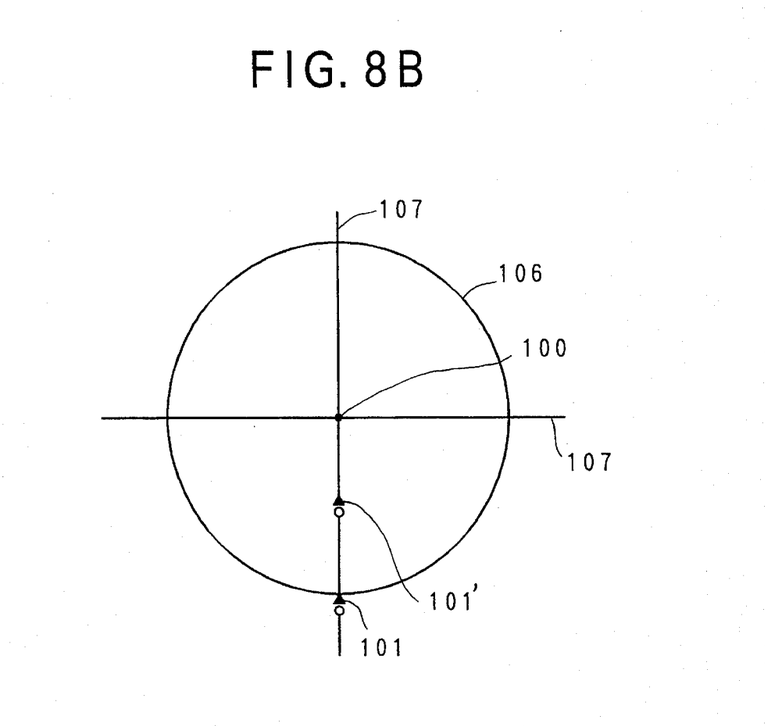
FIG. 8B shows the supply of the objective position information with the objective position at the center.

Nextly, it is explained as for the method of judging whether or not it is approaching to the objective position in the above explained objective position information supplying method, by use of FIG. 8B.

In the above explained objective position information supplying method, there is provided a detection boundary line 106 connecting points which have equal distances to each other from an objective position 100 with a center located at the objective position 100 as shown in FIG. 8B. Since these points having the equal distances from the objective position 100 are connected to each other, this detection boundary line becomes a circle as a result. The radius thereof is set for each objective position in accordance with the characteristics of each objective position such as a relationship with the roads at its peripheral.

Then, when it is detected that the self vehicle arrives at the position indicated by a self vehicle position mark 101 in FIG. 8B, i.e., when the self vehicle position and the detection boundary line 106 are coincident to each other, it is informed to the driver that it is approaching to the objective position 100 by the above mentioned method.

According to this method, there is such an advantage that it is possible to judge whether or not the self vehicle is approaching to the objective position by use of a simple program.

In addition, according to the above explained method, the supply of the information to the driver is performed only once when the self vehicle position and the detection boundary line 106 are coincident to each other. The information as for the objective position 100 is not supplied after the self vehicle has advanced to the inside of the detection boundary line 106 (when the position of the self vehicle becomes the position indicated by a self vehicle position mark 101').

On the other hand, when the position of the self vehicle coincides with the detection boundary line 106 at the time of advancing to the outside of the detection boundary line 106 from the inside of the detection boundary line 106, the information as for the objective position 100 is not supplied.

However, according to the objective position approaching judgement method in the above mentioned objective position information supplying method, the detection boundary line is a circle, and the information as for the objective position is supplied to the driver only once when the detection boundary line and the self vehicle position are coincident to each other at the time of advancing to the inside of the detection boundary line. Thus, according to the study and research conducted by the inventor of the present application, there are various problems in this method as following.

Figure 9A:
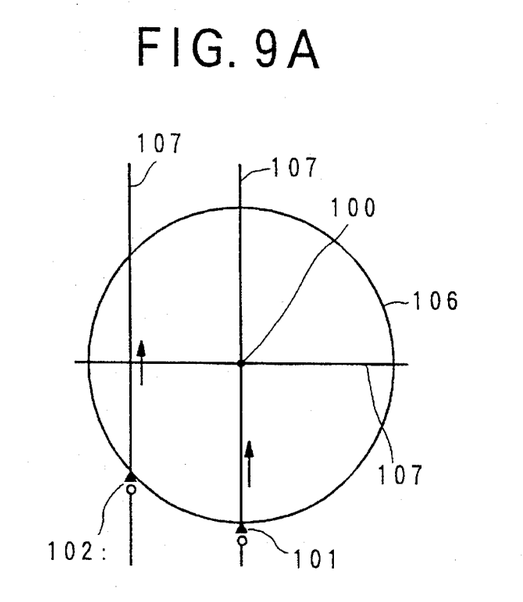
FIG. 9A shows a first problem.
Figure 9B:
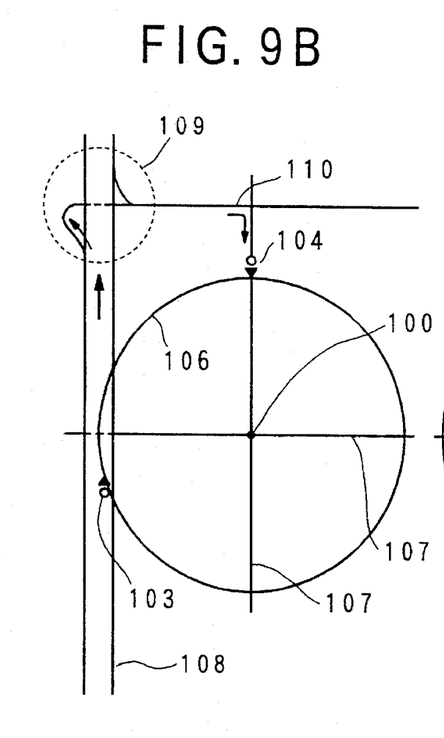
Figure 9C:
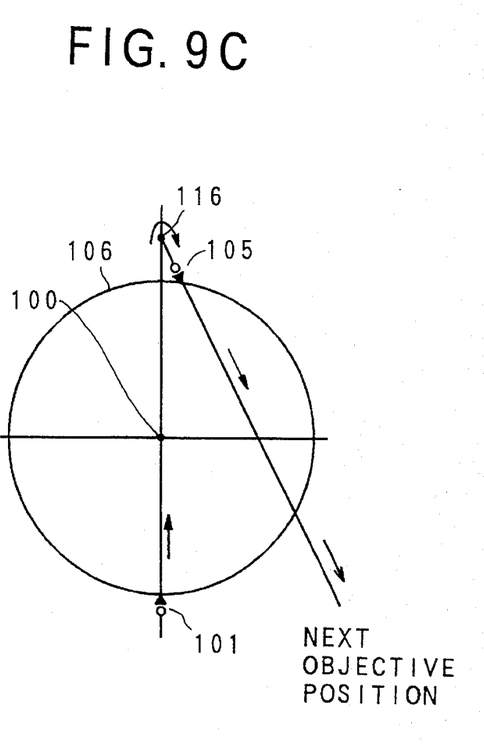
FIG. 9C shows a third problem.

With reference to FIGS. 9A, 9B and 9C, some examples of the problems found by the inventor of the present application are explained hereinbelow.

Firstly, as shown in FIG. 9A, in case that a plurality of roads exist at the inside of the detection boundary line 106, when the self vehicle arrives at the position indicated by a self vehicle position mark 102, the information indicating that it is approaching to the objective position 100 is supplied in the same manner as in the case where the self vehicle arrives at the position indicated by the self vehicle position mark 101. Then, the driver, who is located at the position of the self vehicle position mark 102, erroneously recognizes that it would arrive at the objective position 100 if it advances with maintaining the advance direction of the self vehicle, so that it advances with maintaining the direction as it is, and it goes away from the objective position 100 as a result.

On the other hand, as shown in FIG. 9B, in case that both of general roads 107 and a high way 108 are located at the inside of the detection boundary line 106, when the self vehicle arrives at the position of the self vehicle position mark 103 on the high way 108, the information indicating that it is approaching to the objective position 100 is supplied in the same manner as in the case where the self vehicle arrives at the position of the self vehicle position mark 104. Then, such a case is raised that the driver, who is located at the position of the self vehicle position mark 103, does not use the interchange 109 by erroneous recognition, although he should in fact go out of the high way 108 at an interchange 109 and go toward the objective position 100 via a road 110.

Furthermore, as shown in FIG. 9C, in case that the road to be used when it advances to the next objective position from the objective position 100 is located at the inside of the detection boundary line 106, the approaching information to the objective position 100 is supplied again at the position of the self vehicle mark 105 to the driver who has obtained the approaching information to the objective position 100 at the position of the self vehicle position mark 101 after it has passed through a crossing 116 via the objective position 100. Then, the driver erroneously recognizes that it would be approaching to the objective position 100 again although it is in fact advancing to the next objective position after the objective position 100.

SUMMARY OF THE INVENTION

It is therefore an object of the present invention to provide an objective position information supplying method in a navigation system and a navigation system, which can supply the correct information as for the objective position to the driver.

The above object of the present invention can be achieved by an objective position information supplying method in a navigation system for detecting a present position of a self vehicle. The method includes the steps of: judging whether or not a distance between the detected present position and an objective position is within a predetermined distance set for each of objective positions, which include a position scheduled to pass therethrough and a position scheduled to arrive thereat; judging whether or not a direction to the detected present position from the objective position is within a first angle range, which is set for each of the objective positions on a standard of a direction of the self vehicle to enter each of the objective positions; judging whether or not a direction to the objective position from the detected present position is within a second angle range, which is set with respect to an advance direction of the self vehicle at the detected present position; and supplying a predetermined kind of information as for the objective position to a driver if the judged distance is within the predetermined distance, if the judged direction to the detected present position is within the first angle range, and if the judged direction to the objective position is within the second angle range.

According to the method of the present invention, it is judged whether or not the distance between the detected present position and the objective position is within the predetermined distance. It is judged whether or not the direction to the detected present position from the objective position is within the first angle range. Here, the first angle range is set on the standard of the direction of the self vehicle to enter each of the objective positions. It is judged whether or not the direction to the objective position from the detected present position is within the second angle range. Here, the second angle range is set with respect to the advance direction of the self vehicle. Then, the information as for the objective position e.g., the information indicating that the self vehicle is approaching to the objective position, is supplied to the driver if all of the three judgement results are positive. Namely, if the judged distance is within the predetermined distance, if the judged direction to the detected present position is within the first angle range, and if the judged direction to the objective position is within the second angle range.

Thus, even if the self vehicle is located within the predetermined distance with respect to the objective position, the information as for the objective position is not supplied to the driver in case that the advance direction of the self vehicle is offset with respect to the direction toward the objective position. On the other hand, in case that the advance direction of the self vehicle is coincident or aligned with the direction toward the objective position, the information as for the objective position is supplied to the driver. Consequently, the precise information supply which reflects the actual conditions can be realized.

In one aspect of the method of the present invention, the distance is determined in accordance with a speed of the self vehicle when the self vehicle approaches to the objective position. For example, this distance may be increased when the speed of the self vehicle is increased while this distance may be decreased when the speed of the self vehicle is decreased. Thus, the information supply can be performed which is suitable for the speed of the self vehicle.

In another aspect of the method of the present invention, the first angle range is determined in accordance with a geographical characteristic of the objective position. For example, in city areas where the roads are complicated, the first angle range is decreased while it is increased in mountain areas where the roads are rather simple. Thus, the information supply can be performed which is suitable for the geographical characteristic of the objective position.

In another aspect of the method of the present invention, the second angle range may be determined such that the second angle range is symmetrical with respect to the advance direction of the self vehicle. In this case, the second angle range can be determined in a rather simple manner. Alternatively, the second angle range may be determined such that the second angle range is asymmetrical with respect to the advance direction of the self vehicle. For example, the second angle range is inclined toward the right side from a view point of the driver, since it is more convenient for the driver to drop in a facility as the objective position on the right side than on the left side because of the traffic regulation to keep to the right.

In another aspect of the method of the present invention, the second angle range is determined in accordance with a characteristic of the self vehicle.

In another aspect of the method of the present invention, the direction of the self vehicle to enter each of the objective positions is determined in accordance with a route to the position scheduled to arrive thereat, which is set in advance.

Thus, the information supply can be performed which is suitable for the actual traffic condition of the objective position.

The above object of the present invention can be also achieved by the navigation system provided with: a detection device for detecting a present position of a self vehicle; a judgement device for judging whether or not a distance between the detected present position and an objective position is within a predetermined distance set for each of objective positions, which include a position scheduled to pass therethrough and a position scheduled to arrive thereat, judging whether or not a direction to the detected present position from the objective position is within a first angle range, which is set for each of the objective positions on a standard of a direction of the self vehicle to enter each of the objective positions, and judging whether or not a direction to the objective position from the detected present position is within a second angle range, which is set with respect to an advance direction of the self vehicle at the detected present position; and an information supply device for supplying a predetermined kind of information as for the objective position to a driver if the judged distance is within the predetermined distance, if the judged direction to the detected present position is within the first angle range, and if the judged direction to the objective position is within the second angle range according to a judgement result of the judgement device.

According to the navigation system of the present invention, the detection device detects the present position. The judgement device judges whether or not the distance between the detected present position and the objective position is within the predetermined distance, judging whether or not the direction to the detected present position from the objective position is within the first angle range, and judging whether or not the direction to the objective position from the detected present position is within the second angle range. Then, the information supply device supplies the information as for the objective position to the driver if all of the three judgement results are positive. Namely, if the judged distance is within the predetermined distance, if the judged direction to the detected present position is within the first angle range, and if the judged direction to the objective position is within the second angle range according to the judgement result of the judgement device.

Consequently, the precise information supply which reflects the actual conditions can be realized in the same manner as in the aforementioned method of the present invention.

In one aspect of the navigation system of the present invention, the navigation system is further provided with a memory device for storing the predetermined distance for each of the objective positions, the first angle range for each of the objective positions and the second angle range. Thus, the judging operation can be easily performed by use of the information stored in the memory device.

In another aspect of the navigation system of the present invention, the detection device includes at least one of a geomagnetic sensor, an angular speed sensor, a travel distance sensor and a GPS (Global Positioning System) receiver. Thus, the present position detecting operation can be precisely performed.

In another aspect of the navigation system of the present invention, the navigation system is further provided with a setting device for setting a route to the position scheduled to arrive thereat. Thus, the route can be freely set according to the demand by the driver.

In another aspect of the navigation system of the present invention, the information supply device includes a display device for displaying the information. Thus, the driver can visually recognize the information as for the objective position.

In another aspect of the navigation system of the present invention, the information supply device includes a voice outputting device for outputting the information by a synthetic voice. Thus, the driver can be aurally recognize the information as for the objective position.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3 are diagrams for showing a setting operation of the angle range in the embodiment of the present invention, wherein FIG. 3A shows the setting operation of the angle range at the objective position while

FIG. 4 are diagrams for showing an angle judging operation in the embodiment of the present invention wherein FIG. 4A shows the angle judging operation in the step S4 while

FIG. 8 are diagrams showing an operation in the objective position information supplying method according to the related art wherein FIG. 8A shows the route setting operation up to the position scheduled to arrive thereat while FIG. 9 are diagrams showing problems in the related art wherein FIG. 9B shows a second problem while

DETAILED DESCRIPTION OF THE PREFERRED EMBODIMENTS

Nextly, referring to the accompanying drawings, preferred embodiments of the present invention will be now explained. The embodiments in which the present invention is applied to an on-vehicle navigation system are described here.

(I) System Construction

Figure 1:
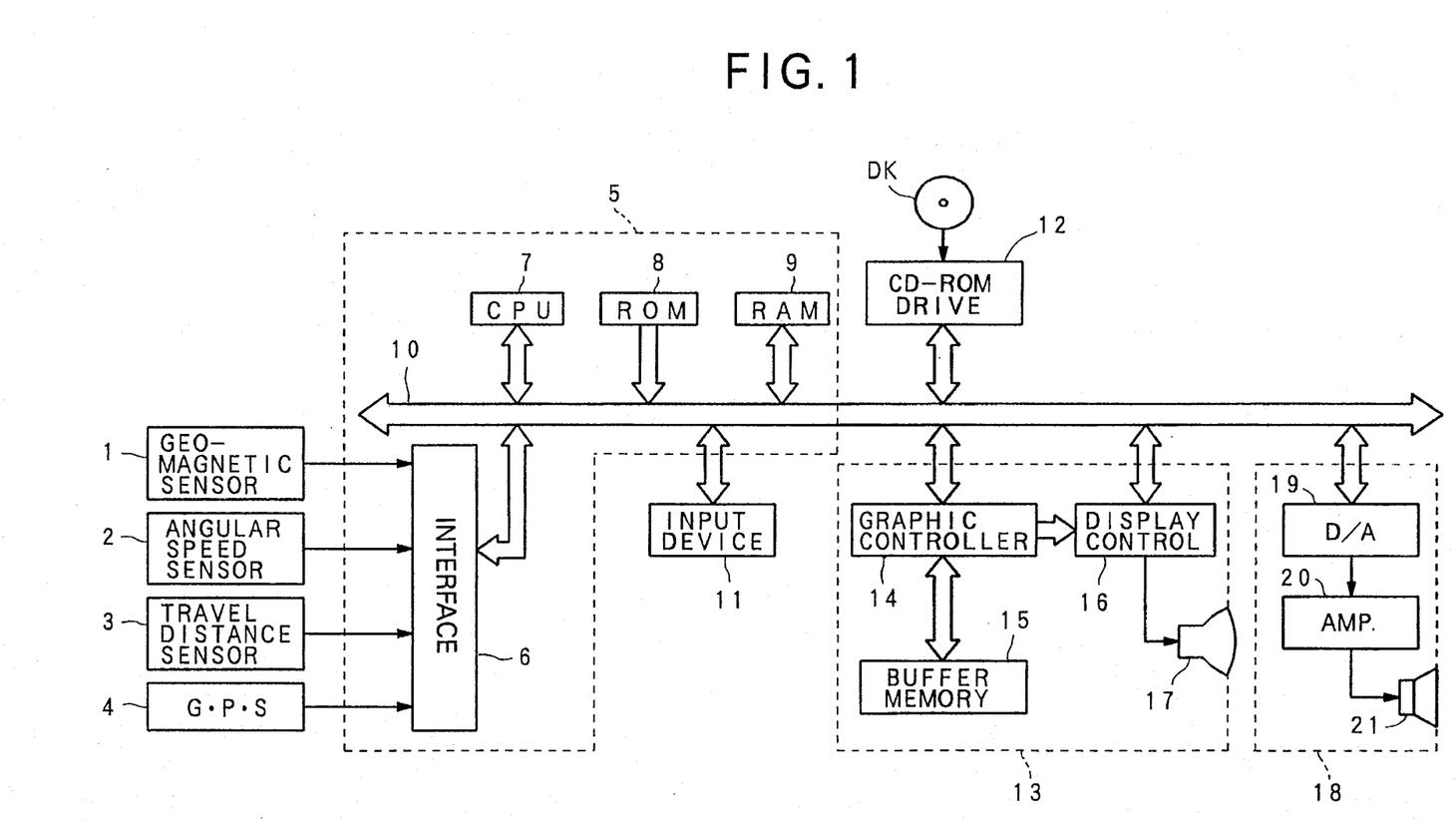
FIG. 1 is a block diagram of a navigation system in an embodiment of the present invention.

First of all, a whole construction of a navigation system as the embodiment of the present invention is explained with referring to FIG. 1.

FIG. 1 is a block diagram showing a basic construction of an on-vehicle navigation system as an embodiment of the present invention.

In FIG. 1, the navigation system is provided with: a geomagnetic sensor 1 for outputting an azimuth data of an advance direction of a self vehicle; an angular speed sensor 2 for detecting an angular speed, at the time when the self vehicle is turning, and outputting an angular speed data; a travel distance sensor 3 for calculating a travel distance by detecting the number of rotations of a shaft of the vehicle and integrating it, and outputting the travel distance data; a GPS receiver 4 for receiving electric waves from GPS satellites and outputting GPS measurement data; a system controller 5 for controlling a whole navigation system on the basis of the azimuth data, the angular speed data, the travel distance data and the GPS measurement data; an input device 11 for inputting various data; a CD-ROM (Compact Disk—Read Only Memory) drive 12 for reading and outputting various data e.g., information as for objective positions, from a CD-ROM disk DK under the control of the system controller 5; a display unit 13 for displaying various display data under the control of the system controller 5; and an audio reproducing outputting 18 for reproducing and outputting various voice data under the control of the system controller 5.

The system controller 5 is provided with: an interface unit 6 for performing an interface operation with an external sensor etc.; a CPU 7 for controlling the whole portion of the system controller 5; a ROM (Read Only Memory) 8 for storing a control program to control the system controller 5; and a RAM (Random Access Memory) 9 having a non-volatile memory not shown for storing various data in a writable manner. The input device 11, the CD-ROM drive 12, the display unit 13 and the audio outputting unit 18 are connected via a bus line 10.

The display unit 13 is provided with: a graphic controller 14 for performing a control of the whole portion of the display unit 13 on the basis of the control data transmitted from the CPU 7 through the bus line 10; a buffer memory 15 consisting of a memory such as a VRAM (Video RAM), for temporarily storing image information, which can be immediately displayed; and a display control unit 16 for controlling the display of the display device 17 such as a liquid crystal display device, a CRT (Cathode Ray Tube) on the basis of the image data outputted from the graphic controller 14.

The audio outputting unit 18 is provided with: a D/A convertor 19 for performing a digital/analog conversion of audio voice digital data transmitted through the bus line 10 from the CD-ROM drive 12 or the RAM 9; an amplifier 20 for amplifying an audio voice signal outputted from the D/A convertor 19; and a speaker 21 for converting the amplified audio voice analog signal to the audio voice and outputting it.

(II) Flow Chart of the Embodiment of the Present Invention

Figure 2:
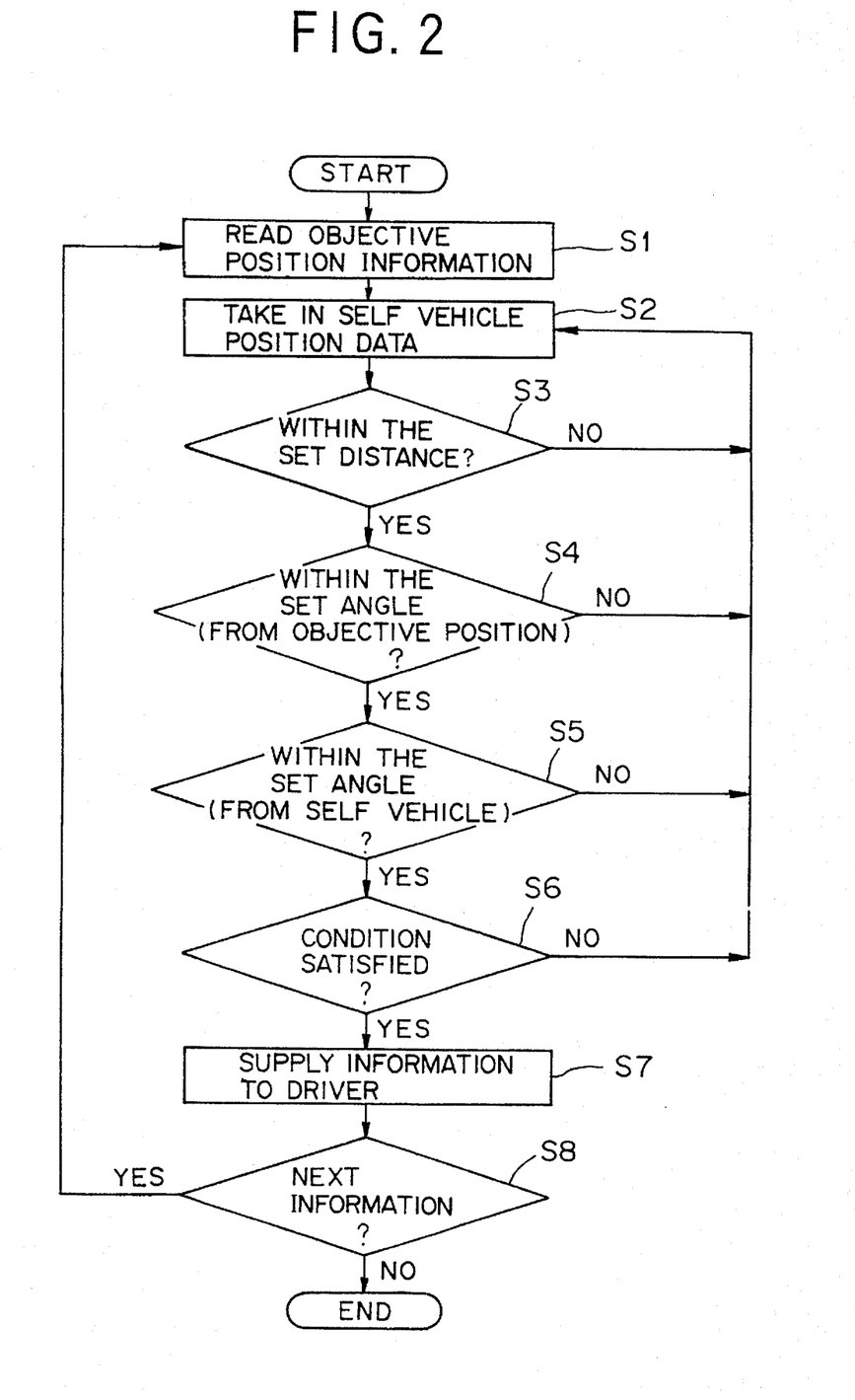
FIG. 2 is a flow chart of the embodiment of the present invention.

Nextly, the process algorithm in the embodiment of the present invention is explained here with reference to the flow chart shown in FIG. 2.

The program related to the present flow chart is recorded in the CD-ROM disk DK, is read out of it through the CD-ROM drive 12 together with various information as for the objective position etc. as the occasion demands, and then is temporarily stored in the RAM 9. The process after that such as a calculation etc., based on the present flow chart, is performed mainly in the CPU 7 by reading the above mentioned program and various data etc. from the RAM 9.

Firstly, at a step S1, the objective position information to be supplied is read out of the RAM 9. Here, the coordinates data (which have longitude data and latitude data) of the objective position, the detection angle data as mentioned later, and the detection distance data as mentioned later are included in the objective position information. Further, date and time etc. are read out as circumstance information at the same time.

Nextly, at a step S2, the self vehicle position data, which has been calculated in the CPU 7 on the basis of the data detected by the geomagnetic sensor 1, the angular speed sensor 2, the travel distance sensor 3 and the GPS receiver 4, are taken in i.e. read out through the RAM 9. The coordinates data (which has the longitude data and the latitude data), the advance azimuth data, and the speed data as well as the self vehicle set angle data mentioned later, are included in the self vehicle position data.

Nextly, at a step S3, the distance data R, which indicates the distance between the self vehicle position and the objective position, is read out of the RAM 9, and is compared with the detection distance data included in the objective position information. Namely, it is judged whether or not the distance between the self vehicle position and the objective position is within the set distance. Then, if the distance data R is longer than the detection distance data (NO), the flow returns to the step S2, so as to obtain the next self vehicle position data. Further, if the distance data R is not longer than the detection distance data (YES), the flow goes to a next step S4.

At the step S4, the detection angle data as the first angle included in the objective position information and the direction of the self vehicle from a view point of the objective position are compared with each other, and it is judged whether or not the self vehicle position is within the detection angle which the objective position has. Namely, it is judged whether or not the direction of the self vehicle from the view point of the objective position is within the range of the angle set to the objective position. Then, if the self vehicle position is not within the range prescribed by the detection angle (NO), the flow returns to the step S2 so as to obtain the next self vehicle position data. On the other hand, if the self vehicle position is within the detection angle (YES), the flow proceeds to a next step S5.

At the step S5, on the contrary to the process at the step S4, the self vehicle set angle data as the second angle included in the self vehicle position data and the direction of the objective position from the view point of the self vehicle portion are compared with each other, so that it is judged whether or not the objective position is within the self vehicle set angle which the self vehicle has. Namely, it is judged whether or not the direction of the objective position from the view point of the self vehicle is within the angle set to the self vehicle. Then, if the objective position is not within the self vehicle set angle (NO), the flow returns to the step S2, so as to obtain the next self vehicle position data. On the other hand, if the objective position is within the self vehicle set angle (YES), the flow proceed to a next step S6.

At the step S6, it is judged whether or not the condition of the additional information as for the objective position is satisfied. Here, the information indicating whether or not the objective position is prohibited to enter at the present time, for example, is included in the additional information as for the objective position, and is compared with the circumstance information such as date and time etc.

If the condition of the additional information is not satisfied (NO), the flow returns to the step S2, so as to obtain the next self vehicle position data. If it is satisfied (YES), the flow proceeds to a next step S7.

At the step S7, the information indicating that it is approaching to the objective position is supplied to the driver. This information supply may be displayed on the display device 17 by the display unit 13, or may be outputted as a voice by the audio outputting unit 18.

Nextly, at a step S8, it is judged whether or not there exists an objective position which information is to be supplied next to the objective position read out at the step S1. If there exists the objective position which information is to be nextly supplied (YES), the flow returns to the step S1, and the objective position information thereof is read out at the step S1, On the other hand, if there does not exists the objective position which information is to be supplied (NO), the process is ended.

More concretely, in the process of the step S8, for example, if the objective position at the objective position information read at the step S1 is the position scheduled to pass therethrough, the objective position information which is the next position scheduled to pass therethrough is read out. And, the process is ended in case that the objective position is the arrival destination position (i.e. the position scheduled to arrive thereat).

The order of the processes of the step S3, the step S4 and the step S5 is not limited to the above described order. Even if these three processes are performed in any order, the same result can be obtained.

Nextly, the detection angle data and the detection distance data included in the objective position information read at the step S1, and the self vehicle set angle data included in the self vehicle position data which is read at the step S2, are explained with referring to FIG. 3.

In FIG. 3, a road is not illustrated so as to simplify the figure.

Figure 3A:
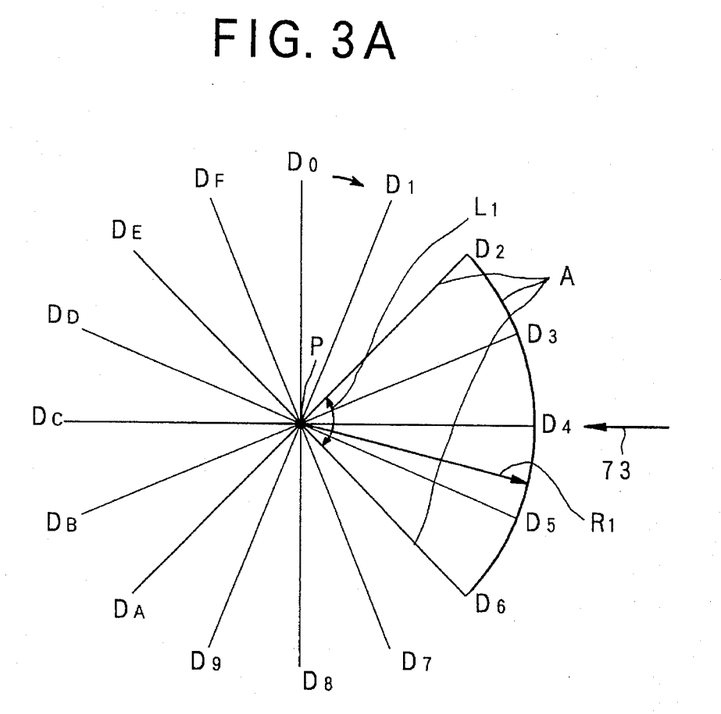

First of all, the detection angle data is explained with referring to FIG. 3A.

Initially, when the route to the position scheduled to arrive at is set by the driver before the self vehicle starts (see FIG. 8A), the scheduled entering direction 73 is determined with respect to the objective position P on the route in FIG. 3A. The detection angle L1 of the objective position P which is the first angle is specified so as to include the scheduled entering direction 73 with respect to the scheduled entering direction 73 as the standard. The specification of this detection angle L1 is performed, as shown in FIG. 3A, by dividing a whole azimuth equally by 16 from $D_O$ to $D_F$ in a clockwise direction, and specifying the detection starting angle and the detection ending angle. For example, in case of specifying the detection angle L1 shown in FIG. 3A, the detection starting angle becomes D2 and the detection ending angle becomes D6. Here, the reason why the division number is 16 is that it is preferable for the process in the CPU 7 in the present embodiment. However, the division number is not fixed to this value of 16.

Further, the magnitude of the detection angle L1 is determined by the geographical property of the objective position P. More concretely, for example, it is determined to be about 90 degrees in case that roads are complicated as in city areas while it is determined to be about 180 degrees in areas where there are few roads as in mountain areas.

Further, the center of the detection angle L1 is not necessary to be the scheduled entering direction 73, but may be rotated in a clockwise direction or an counterclockwise around the objective position P as a center to be deviated with respect to the scheduled entering direction 73, in accordance with the geographical properties e.g. the relationship with surrounding roads of the objective position P. However, in this case, it is necessary that the scheduled entering direction 73 is included in the range of the detection angle L1.

Nextly, the detection distance data is explained by use of FIG. 3A.

When the route up to the scheduled arrival position is set by the specification of the user before the self vehicle starts and the objective position is determined (see FIG. 8A), the detection distance data for each objective position is read out from the CD-ROM disk DK through the CD-ROM drive 12, and is stored into the RAM 9. The detection distance R1 as the detection distance data is the distance with respect to the objective position P as a center, and the length thereof is determined by the geographical property of the objective position P. More concretely, for example, it is about 300 meters in the city areas, and it is about 500 meters in the mountain areas.

Nextly, it is possible to vary the detection distance R1 on the basis of the speed of the self vehicle at the time of advancing to the objective position. More concretely, for example, it is preferable to be about 560 meters at the time when the speed of the self vehicle is not lower than 100 kilometers per hour, it is preferable to be about 400 meters at the time when the speed of the self vehicle is not higher than 100 kilometers per hour and not lower than the 60 kilometers per hour, and it is preferable to be about 250 meters at the time when the speed of the self vehicle is not higher than 60 kilometers per hour.

By the processes mentioned above, the detection angle L1 and the detection distance R1 are determined. By superimposing these, the detection boundary line A becomes fan-shaped as shown in FIG. 3A as a result.

Figure 3B:
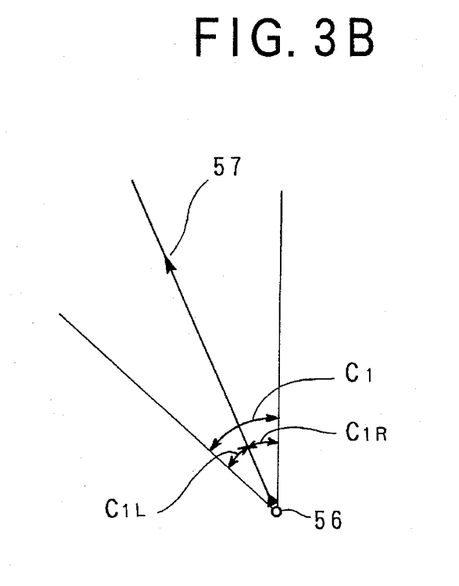
FIG. 3B shows the setting operation of the angle range at the self vehicle.

Nextly, the self vehicle set angle data is explained by use of FIG. 3B.

In FIG. 3B, the self vehicle set angle C1 which is the second angle is set on the basis of the self vehicle advance direction 57 with respect to the self vehicle position as the center indicated by a self vehicle position mark 56. Further, the self vehicle set angle C1 is set by the combination of the self vehicle right set angle $C_{1R}$ and the self vehicle left set angle $C_{1L}$. Therefore, the self vehicle set angle C1 is set in not only a manner that the self vehicle advance direction 57 is the center thereof (i.e. in a symmetrical manner), but also a manner that the self vehicle left set angle $C_{1L}$ is larger than the self vehicle right set angle $C_{1R}$ (i.e. in an asymmetrical manner). This is because it may be more convenient to use the facilities on the left side with respect to the advance direction than on the right side with respect to the advance direction, when the self vehicle advances to the objective position in case of an automobile.

Furthermore, the magnitude of the self vehicle set angle C1 may be varied in correspondence with the property of the self vehicle (e.g. speed). Namely, it may be narrowed when the self vehicle is travelling at high speed, while it may be widened when the self vehicle is travelling at low speed. More concretely, when the speed is not lower than 80 kilometers per hour, it preferably is set to be about 70 degrees. When the speed is not higher than 80 kilometers per hour and not lower than 40 kilometers per hour, it is preferably set to be about 90 degrees. When the speed is not higher than 40 kilometers per hour, it is preferably set to be about 120 degrees.

Figure 4A:
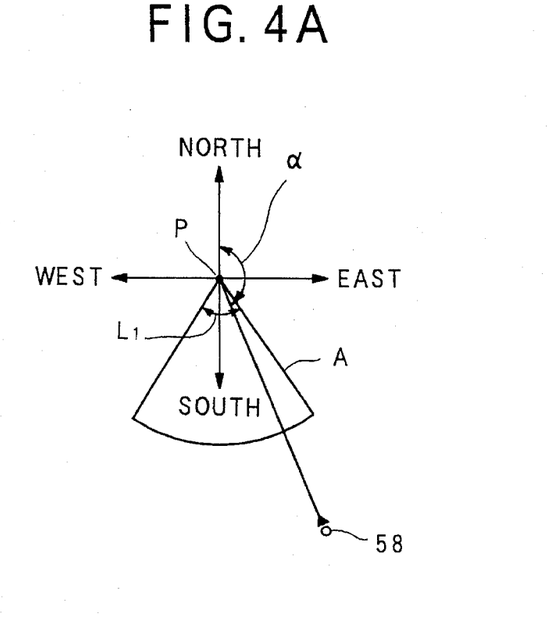
Figure 4B:
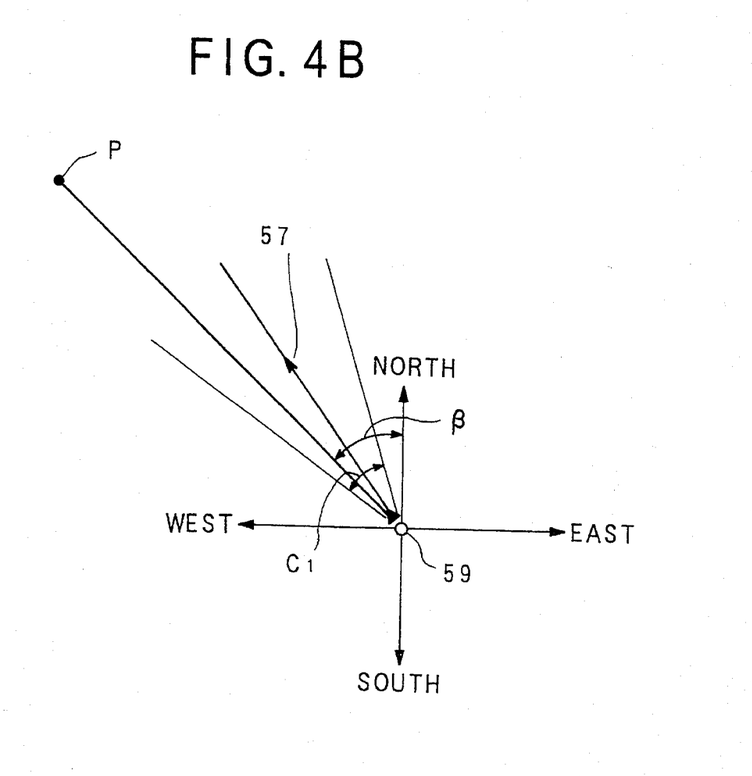
FIG. 4B shows the angle judging operation in the step S5.

Nextly, the explanation is done by use of FIG. 4 as for the judgement whether or not the self vehicle position is located within the detection angle L1 which the objective position P has in the step S4 (FIG. 4A), and the judgement whether or not the position of the objective position P is located within the self vehicle set angle C1 which the self vehicle has in the step S5 (FIG. 4B).

In FIG. 4, roads are not illustrated in order to simplify the figure.

First of all, it is explained as for the judgement whether or not the self vehicle position is within the detection angle L1 which the objective position P has, with referring to FIG. 4A.

Firstly, as shown in FIG. 4A, a line is drawn from the position of the objective position P to the position of the self vehicle position mark 58, and the angle α between the direction of this line and the azimuth of north. Then, the detection starting angle and the detection ending angle of the detection angle L1 with respect to the north direction as the standard are respectively compared with the direction α (see FIG. 3A), so that it is judged whether or not the direction of the self vehicle from the view point of the objective position P is within the range prescribed by the detection angle L1.

Nextly, it is explained as for the judgement whether or not the position of the objective position P is within the self vehicle set angle C1 which the self vehicle has, with referring to FIG. 4B.

Firstly, as shown in FIG. 4B, a line is drawn from the position of a self vehicle position mark 59 to the position of the objective position P. The angle β between the direction of this line and the azimuth of north is calculated with respect to the north direction as a standard. Then, the angle β and the self vehicle set angle C1 with respect to the azimuth of north as the standard are compared with each other, so that the judgement whether or not the direction of the objective position P from the view point of the self vehicle position is within the range of the self vehicle set angle C1.

In the above described process, various data such as the objective position information etc. are read out of the CD-ROM disk DK through the CD-ROM drive 12. However, it is possible to supply the various data by a flexible disk, an IC (Integrated Circuit) card or by wireless (electric wave) communication etc.

(III) First Example

Nextly, a first example of the operation by the embodiment of the present invention is explained with reference to FIG. 5.

The first example corresponds to the first problem of the related art (see FIG. 9A).

Figure 5:
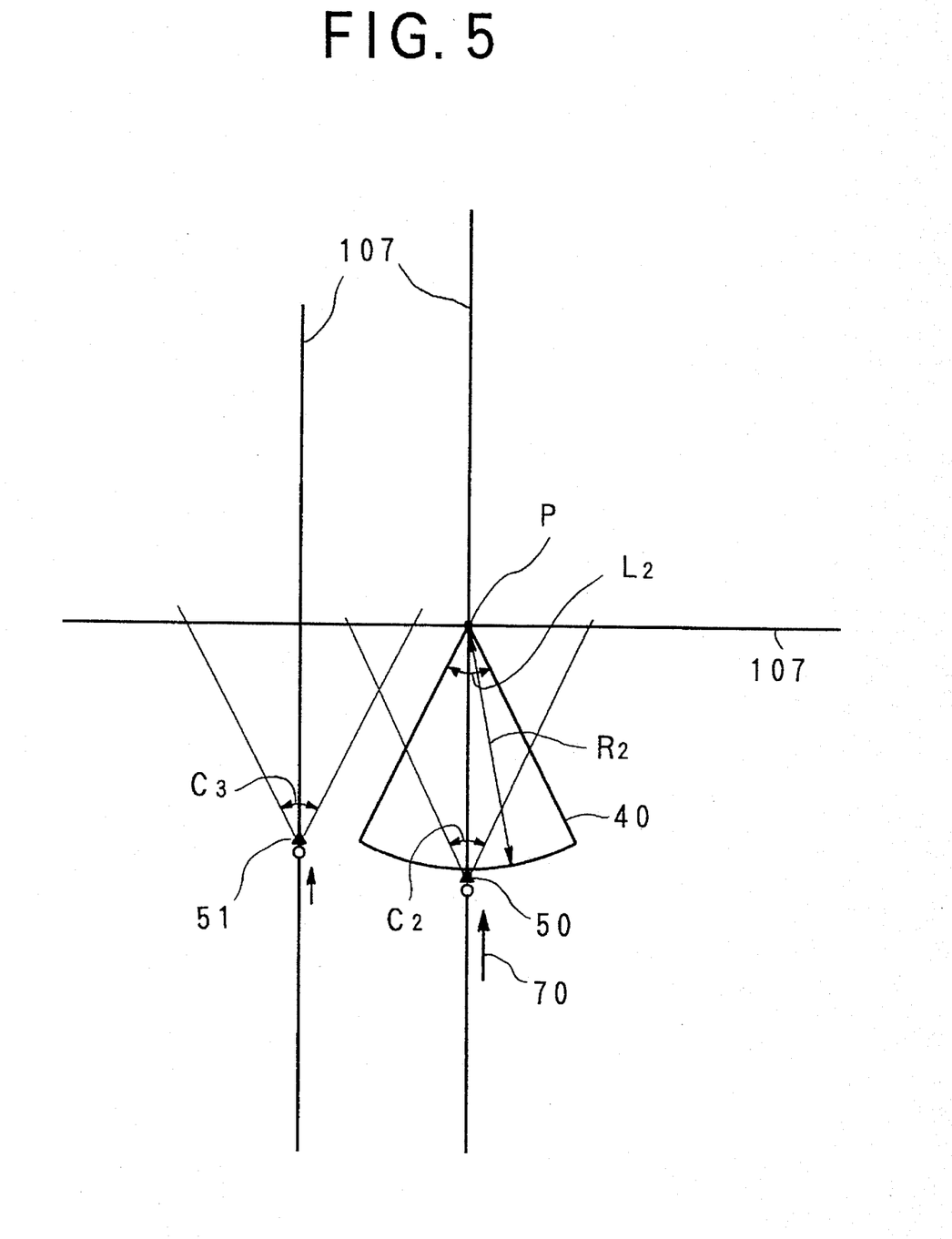
FIG. 5 is a diagram showing a first example of the operation by the embodiment of the present invention.

In FIG. 5, a detection boundary line 40 is a detection boundary line set at the objective position P on the basis of a scheduled entering direction 70, and is composed of a detection angle L2 and a detection distance R2.

Further, self vehicle setting angles C2 and C3 are self vehicle setting angles set according to the characteristics of the self vehicle, which exists at each of self vehicle position marks 50 and 51 respectively.

According to the first example of the operation, at the position indicated by the self vehicle position mark 50, since there exists the self vehicle on the detection boundary line set at the objective position P, and since the objective position P exists within the range of the self vehicle setting angle C2 which the self vehicle has, the information indicating that it is approaching the objective position P is supplied to the driver. On the other hand, at the position indicated by the self vehicle position mark 51, since the self vehicle does not exists on the detection boundary line which the self vehicle has, and since the objective position P does not exists in the range of the self setting angle C2, the information as for the objective position P is not supplied to the driver.

According to the first example of the operation, the information indicating that it is approaching to the objective position is not supplied if the advance direction is not directed to the objective position P even if it is approaching to the objective position P. Thus, it becomes possible to reduce the driver's erroneous recognition with respect to the objective position P.

(IV) Second Example

Figure 6:
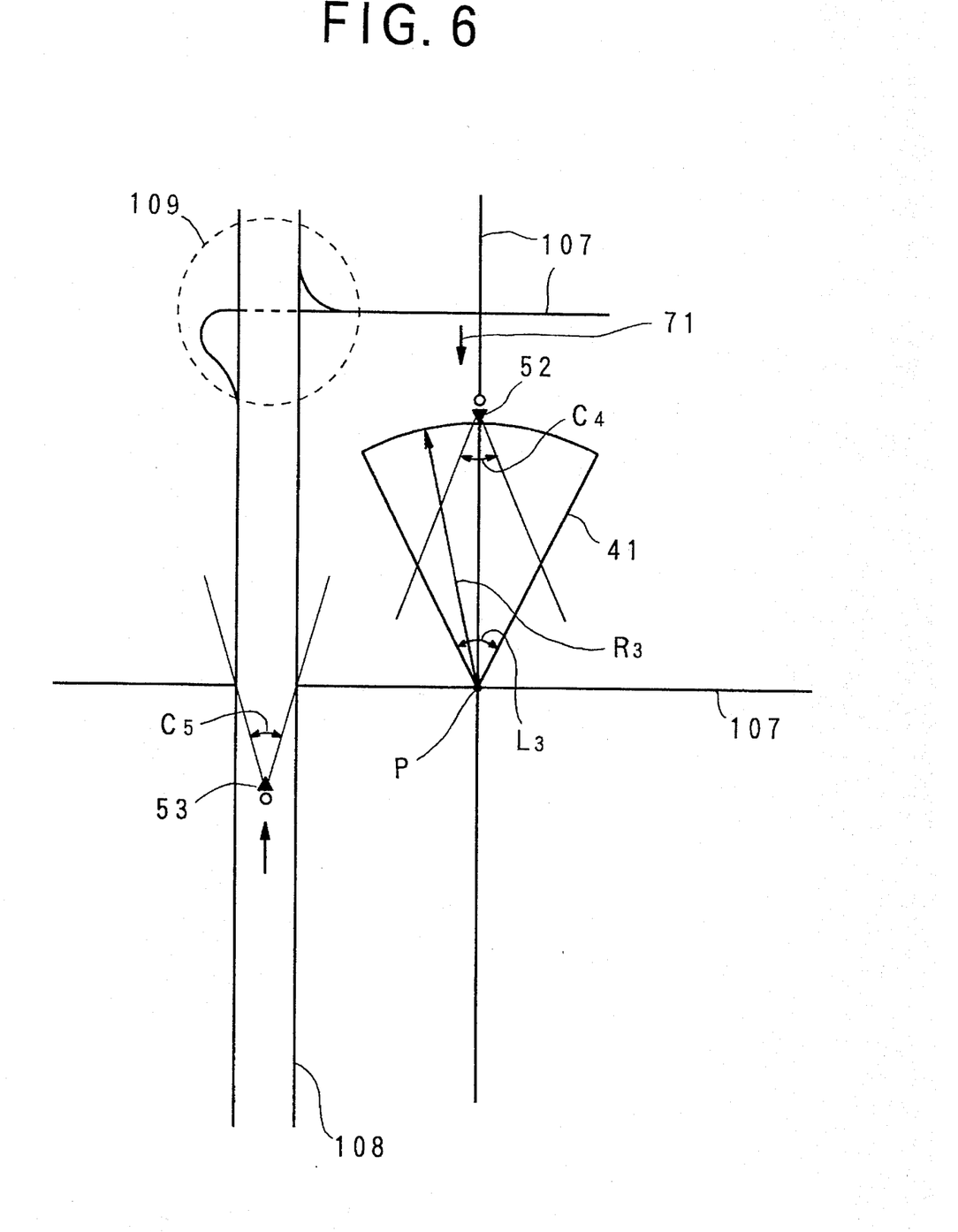
FIG. 6 is a diagram showing a second example of the operation by the embodiment of the present invention.

Nextly, a second example of the operation by the embodiment of the present invention is explained with referring to FIG. 6.

The second example corresponds to the second problem of the related art (see FIG. 9B).

In FIG. 6, a detection boundary line 41 is a detection boundary line set at the objective position P on the basis of a scheduled entering direction 71, and is composed of a detection angle L3 and a detection distance R3.

Further, self vehicle setting angles C4 and C5 are self vehicle setting angles set according to the characteristics of the self vehicle, which exists at each of self vehicle position marks 52 and 53 respectively.

According to the second example of the operation, at the position indicated by the self vehicle position mark 52, since there exists the self vehicle on the detection boundary line set at the objective position P, and since the objective position P exists within the range of the self vehicle setting angle C4 which the self vehicle has, the information indicating that it is approaching to the objective position P is supplied to the driver. On the other hand, at the position indicated by the self vehicle position mark 53, since the self vehicle does not exists on the detection boundary line which the self vehicle has, and since the objective position P does not exists in the range of the self vehicle setting angle C5, the information as for the objective position P is not supplied.

According to the second example of the operation, during the travel on the high way 108, the information indicating that it is approaching to the objective position is not supplied, and the driver correctly can use the interchange 109. When it comes to the position indicated by the self vehicle position mark 52, the information indicating that it is approaching to the objective position P1 is supplied to the driver for the first time. Accordingly, it becomes possible to reduce the driver's erroneous recognition with respect to the objective position P.

(V) Third Example

Figure 7:
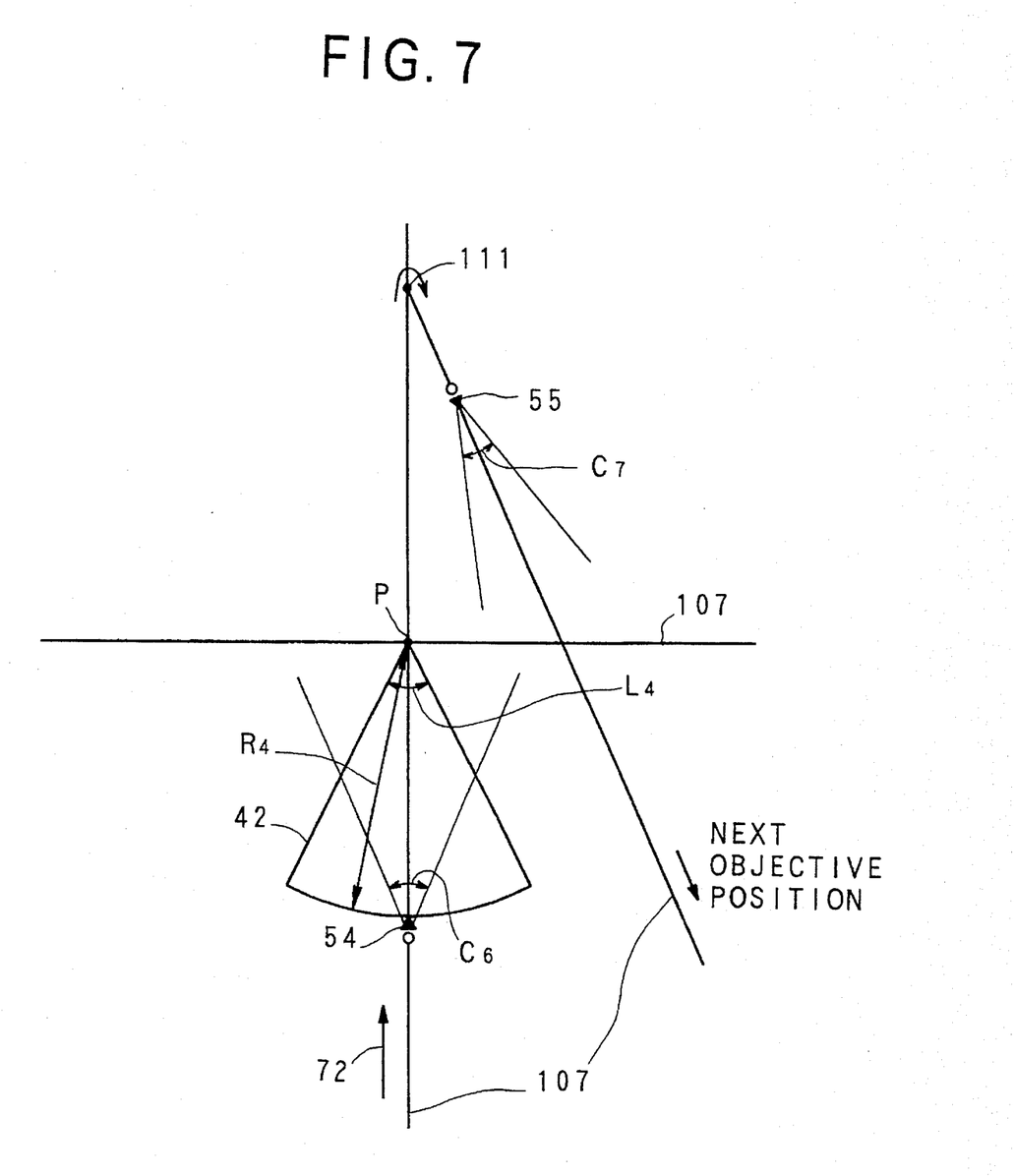
FIG. 7 is a diagram showing a third example of the operation by the embodiment of the present invention.

Nextly, a third example of the operation by the embodiment of the present invention is explained by use of FIG. 7.

The third example corresponds to the third problem of the related art (see FIG. 9C).

In FIG. 7, a detection boundary line 42 is a detection boundary line set at the objective position P on the basis of the scheduled entering direction 72, and is composed of a detection angle L4 and a detection distance R4.

Self vehicle setting angles C6 and C7 are self vehicle setting angles set according to the characteristics of the self vehicle which exists at each of the positions indicated by the self vehicle position marks 54 and 55.

According to the third example of the operation, at the position indicated by the self vehicle position mark 54, since the self vehicle exists on the detection boundary line set at the objective position P, and since the objective position P exists within the range of the self vehicle setting angle C6 which the self vehicle has, the information indicating that it is approaching to the objective position P is supplied to the driver. On the other hand, at the position indicated by the self vehicle position mark 55, since the self vehicle does not exists on the detection boundary line which the objective position P has, and since the objective position P does not exists within the range prescribed by the self vehicle setting angle C7, the information related to the objective position P is not supplied.

Even if the self vehicle further advances from the position indicated by the self vehicle position mark 55, the information related to the objective position P is not supplied.

According to the third example of the operation, even if it passes through a vicinity of the objective position P and moves to the next objective position, after the information indicating that it is approaching to the objective position P is supplied at the position indicated by the self vehicle position mark 54, the information as for the objective position P is not supplied again. Thus, the driver can be guided to the next objective position correctly, after passing through the objective position P.

In the aforementioned embodiments, the objective position is the scheduled passing position or the scheduled arrival position which are set in advance. However, any position can be set as the objective position as long as the scheduled entering direction of the position can be set in advance. Further, with respect to one objective position, two or more scheduled entering directions may be set.

More concretely, for example, it is possible to set the parking lot or the parking area on a high way as the objective position. In this case, since the scheduled entering direction is determined in advance (which is the entering direction into the parking lot or the parking area on the high way), the data related to the scheduled entering direction is not set by the user but the data stored in the CD-ROM 12 is used by reading it to the RAM 9.

Furthermore, in case of a parking lot on a general way, since there normally exist two directions as the entering direction, the detection boundary line is equal to a combined line of two detection boundary lines on the basis of two scheduled entering directions, so that the detection angle is set to be wider than the case based on one entering direction.

Furthermore, as another concrete example, it is also possible to set the gasoline stand as the objective position. In this case, in the same manner as in the case of the parking lot or the parking area on the high way, normally there are set a plurality of the scheduled entering directions, and the detection angle is set to be wider than the case based on one scheduled entering direction. Further, in case of setting the gasoline stand as the objective position, the data stored in the CD-ROM in advance may be used as the data as for the detection distance and the detection angle, or the user may set the data as the occasion demands.

Further, in case that the position such as a crossing where a plurality of roads are crossing is set as the objective position, on the basis of two or more scheduled entering directions, it is possible to set a plurality of detection boundary lines for one objective position.

According to the present embodiment, if the distance between the self vehicle position and the objective position is within the predetermined distance, if the direction of the self vehicle position from the view point of the objective position is within the range of the first direction, and if the direction of the objective position from the view point of the self vehicle position is within the range of the second angle, the predetermined information as for the objective position is supplied to the driver. Accordingly, if the advance direction of the vehicle is offset from the direction toward the objective position while the self vehicle is within the predetermined distance with respect to the objective position, the information as for the objective position is not supplied, so that more precise information supplement is possible.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An objective position information supplying method in a navigation system of detecting a present position of a self vehicle, comprising the steps of:

judging whether or not a distance between the detected present position and an objective position is within a predetermined distance set for each of objections positions, which include a position scheduled to pass therethrough and a position scheduled to arrived thereat;

judging whether or not a direction to the detected present position from the objective position is within a first angle range, which is selected in advance for each of the objective positions, said first angle range being relative to a direction of the self vehicle entering each of the objective positions, said selected first angle range being stored in a memory device as first angle range data for each of the objective positions;

judging whether or not a direction to the objective position from the detected present position is within a second angle range, which is set with respect to an advance direction of the self vehicle at the detected present position; and supplying a predetermined kind of information as for the objective position to a driver if the judged distance is within the predetermined distance, if the judged direction to the detected present position is within the first angle range, and if the judged direction to the objective position is within the second angle range.

2. A method according to claim 1, wherein the distance is determined in accordance with a speed of the self vehicle when said self vehicle approaches to the objective position.

3. A method according to claim 1, wherein the first angle range is selected in accordance with a geographical characteristic of the objective position.

4. A method according to claim 1, wherein the second angle range is determined such that the second angle range is symmetrical with respect to the advance direction of the self vehicle.

5. A method according to claim 1, wherein the second angle range is determined such that the second angle range is asymmetrical with respect to the advance direction of the self vehicle.

6. A method according to claim 1, wherein the second angle range is determined in accordance with a characteristic of the self vehicle.

7. A method according to claim 1, wherein the direction of the self vehicle to enter each of the objective positions is determined in accordance with a route to the position scheduled to arrive thereat, which is set in advance.

8. An objective position information supplying method according to claim 1, wherein said supplying step supplies said predetermined kind of information by a synthetic voice outputted by a voice outputting means.

9. A navigation system comprising:

a detection means for detecting a present position of a self vehicle;

a judgment means for judging whether or not a distance between the detected present position and an objective position is within a predetermined distance set for each of objective positions, which include a position scheduled to pass therethrough and a position scheduled to arrive thereat, judging whether or not a direction to the detected present position from the objective position is within a first angle range, which is selected in advance for each of the objective positions, said first angle range being relative to a direction of the self vehicle entering each of the objective positions, and judging whether or not a direction to the objective position from the detected present position is within a second angle range, which is set with respect to an advance direction of the self vehicle at the detected present position;

a memory means for storing the selected first angle range as first angle range data for each of the objective positions; and an information supply means for supplying a predetermined kind of information as for the objective position to a driver if the judged distance is within the predetermined distance, if the judged direction to the detected present position is within the first angle range, and if the judged direction to the objective position is within the second angle range according to a judgment result of said judgment means.

10. A navigation system according to claim 9 wherein said memory means also stores the predetermined distance for each of the objective positions, and the second angle range.

11. A navigation system according to claim 9, wherein said detection means comprises at least one of a geomagnetic sensor, an angular speed sensor, a travel distance sensor and a GPS (Global Positioning System) receiver.

12. A navigation system according to claim 9, further comprising a setting means for setting a route to the position scheduled to arrive thereat.

13. A navigation system according to claim 9, wherein said information supply means comprises a display means for displaying the information.

14. A navigation system according to claim 9, wherein said information supply means comprises a voice outputting means for outputting the information by a synthetic voice.

* * * * *